United States Patent
Roberts et al.

(10) Patent No.: US 9,896,921 B2
(45) Date of Patent: Feb. 20, 2018

(54) ENCAPSULATED MICROENERGETIC MATERIAL

(71) Applicant: LAWRENCE LIVERMORE NATIONAL SECURITY, LLC, Livermore, CA (US)

(72) Inventors: Jeffery James Roberts, Livermore, CA (US); Roger D. Aines, Livermore, CA (US); Eric B. Duoss, Dublin, CA (US); Christopher M. Spadaccini, Oakland, CA (US); Kevin S. Vandersall, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 15/392,799

(22) Filed: Dec. 28, 2016

(65) Prior Publication Data
US 2017/0107806 A1    Apr. 20, 2017

Related U.S. Application Data

(62) Division of application No. 13/944,676, filed on Jul. 17, 2013, now Pat. No. 9,562,426.

(51) Int. Cl.
| | |
|---|---|
| E21B 43/263 | (2006.01) |
| F42D 1/22 | (2006.01) |
| C09K 8/92 | (2006.01) |
| C09K 8/62 | (2006.01) |

(52) U.S. Cl.
CPC .............. *E21B 43/263* (2013.01); *C09K 8/62* (2013.01); *C09K 8/92* (2013.01); *F42D 1/22* (2013.01)

(58) Field of Classification Search
CPC ............ E21B 43/263; C09K 8/62; C09K 8/92
USPC ...................................... 166/280.1
See application file for complete search history.

(56) References Cited

U.S. PATENT DOCUMENTS

| | | | |
|---|---|---|---|
| 4,380,948 A | 4/1983 | Loving, Jr. et al. | |
| 7,134,492 B2 * | 11/2006 | Willberg | E21B 47/00 166/250.1 |
| 7,431,083 B2 | 10/2008 | Olsen | |
| 8,342,094 B2 * | 1/2013 | Marya | E21B 43/117 102/305 |
| 2007/0036977 A1 | 2/2007 | Sinclair et al. | |

FOREIGN PATENT DOCUMENTS

WO    2015009368    1/2015

OTHER PUBLICATIONS

International Search Report and Written Opinion for PCT/US2014/042116 related to U.S. Appl. No. 13/944,676, 15 pages.

\* cited by examiner

*Primary Examiner* — Doug Hutton, Jr.
*Assistant Examiner* — Ashish Varma
(74) *Attorney, Agent, or Firm* — Eddie E. Scott

(57) ABSTRACT

Providing high energy materials that can be placed in previously created fractures and activating them in place to extend or change an existing fracture system. Also detecting the location of fractures or permeable pathways and a means to assess the extent and efficiency of proppant emplacement.

9 Claims, 11 Drawing Sheets

US 9,896,921 B2

ENCAPSULATED MICROENERGETIC MATERIAL

CROSS-REFERENCE TO RELATED APPLICATIONS

The present application is a Division of application Ser. No. 13/944,676 filed Jul. 17, 2013, entitled "Encapsulated Microenergetic Material," now U.S. Pat. No. 9,562,426; the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present invention relates to fracturing a geological formation and more particularly to fracturing a geological formation using encapsulated microenergetic material.

State of Technology

Fracking is a technique in which typically water is mixed with sand and chemicals, and the mixture is injected at high pressure into a wellbore to create fractures, which form conduits along which fluids such as gas, petroleum, and groundwater may migrate to the well. The technique is very common in wells for shale gas, tight gas, tight oil, and coal seam gas. Fracturing in rocks at depth tends to be suppressed by the confining pressure, due to the load caused by the overlying rock strata. This is particularly so in the case of "tensile" fractures, which require the walls of the fracture to move apart, working against this confining pressure. Hydraulic fracturing occurs when the effective stress is reduced sufficiently by an increase in the pressure of fluids within the rock, such that the minimum principal stress becomes tensile and exceeds the tensile stress of the material. Fractures formed in this way will in the main be oriented in the plane perpendicular to the minimum principal stress and for this reason induced hydraulic fractures in well bores are sometimes used to determine the orientation of stresses.

It is currently difficult to detect the location, shape, and extent of an underground fracture, such as those created during natural gas extraction by hydrofracturing. It is of considerable interest to know the exact shape and orientation of the fractures and fracture network for design purposes, and to ensure that the rock volume is adequately accessed by the created fractures. Today there is no direct means to do this other than to excavate the fracture, which cannot be done except in extraordinary circumstances. Geophysical methods are used to attempt to image the contrasting properties between the fluid-filled fracture and the rock, but these methods are typically low resolution (meters) by comparison to the aspect of the fracture (millimeters) making it nearly impossible to image the fracture. An additional need is to know the emplacement depth and distribution pattern of proppant. Methods of determining this are currently lacking. The invention describes a method of locating the emplaced proppant material through acoustic emissions of emplaced encapsulated energetic microcapsules.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides high energy materials that can be placed in previously created fractures and activated in place in order to extend or change an existing fracture system. The present invention also provides detecting the location of fractures or permeable pathways and a means to assess the extent and efficiency of proppant emplacement.

In one embodiment, the present invention provides a system to emplace microenergetic materials into fractures of any size, and provides a variety of mechanisms for managing the size and timing of energy release. Embodiments of the present invention include the encapsulation of microenergetic materials, their emplacement, and triggering methodology. Encapsulated microenergetic materials, fuels and oxidants are created.

In one embodiment, the present invention provides a system for mapping fractures in underground formations. The system provides a method of detecting the location of fractures or permeable pathways.

The present invention has use in expanding fractures in rocks in creating more effective fracture networks and modifying fracture distributions, in extending fracture networks away from the borehole in geologic formations, in detecting the location of fractures, openings, and permeable pathways, and in enhancing drilling and hydrofracturing. Some of the specific advantages and uses of encapsulated microenergetic materials of the present invention include expanding fractures, nucleating fracture points, encapsulating insensitive explosives including triamino-trinitrobenzene (TATB), encapsulating PETN and LM-105 explosives, protecting explosives from degradation via temperature and chemical reaction including keeping bacteria away from the explosive material, enhancing the transport into fractures including desirable surface parameters, materials, and buoyancy, being positioned and stored in fractures until detonation is desired, use in other applications where it is hard to get explosives into small spaces, use as acoustic sources for mapping fractures, and other applications where encapsulated microenergetic materials can be used.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1A:
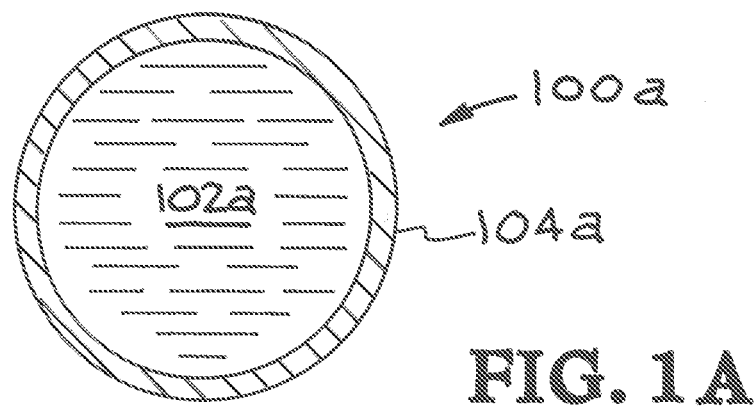
FIGS. 1A, 1B, and 1C illustrate some embodiments of encapsulated energetic material of the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Fracturing shales and other rocks for energy production is generally done with pressurized fluids (hydrofracking). However, it is advantageous to also use alternative fracturing methods and systems to obtain optimal, or better, fracture distributions and to provide new and better fracturing systems. High energy materials can be placed in previously created fractures, and activated in place in order to extend or change the shape of an existing fracture system. In one embodiment, the present invention provides a system to emplace microenergetic materials into fractures of any size, and provides a variety of mechanisms for managing the size and timing of energy release. Embodiments of the present invention include the encapsulation of microenergetic materials, their emplacement, and triggering methodology. Encapsulated microenergetic materials, fuels and oxidants are created.

Embodiments of the present invention provide many advantages and are particularly useful in (1) expanding underground fractures or improving fracture network properties with explosives or highly energetic materials, and (2) detecting the location of fractures or permeable pathways, and (3) in determining the extent and location of proppant emplacement, and (4) initiating new failure points for subsequent fracture stimulation by hydrofracturing. In both cases it is of interest to emplace explosive or energetic material deep within a fracture or other permeable pathway. That is difficult today because explosives are solids or at most, gels, and cannot be placed deep into thin fractures. The present invention changes the properties of the explosive by encapsulating it into polymer-coated spheres that are small enough to travel into a fracture along with fluids that are pumped into the fracture. This makes it possible to place explosives and energetic materials into the fractures well away from the borehole. This is advantageous as the energy from the emplaced material is directed at the formation and not in the immediate vicinity of the borehole. This protects the borehole and creates additional fractures deeper in the reservoir.

The encapsulated explosive can also be mixed with non-explosive material such as conventional proppant. This ensures that new fractures, once formed or extended, will remain open. It also provides a means to vary the intensity and impulse shape of the pressure wave imposed on the fracture walls. This is of great value in providing exactly the correct energetic pulse to fracture the rock without pulverizing or compressing it. The energetic material can also be of mixed types to achieve this goal, such as a fraction of the capsules made of high explosive, and a fraction made of less energetic material with a slower impulse rate. Finally, the detonation of the capsules may be used to release other chemicals used for treatment or tracing purposes, which have been encapsulated and introduced into the fracture along with the microenergetic materials. Upon their detonation, the accompanying treatment chemicals are released by the shock wave. These could include surfactants, asphaltene inhibitors, or various gas generating chemicals designed to help remove the water mixture from the well for production purposes.

The present invention has use in expanding fractures in rocks in creating more effective fracture networks and modifying fracture distributions, in extending fracture networks away from the borehole in geologic formations, in detecting the location of fractures, openings, and permeable pathways, and in enhancing drilling and hydrofracturing. Some of the specific advantages and uses of encapsulated microenergetic materials of the present invention include the following:

expanding fractures,
nucleating fracture points,
encapsulating insensitive explosives including triaminotrinitrobenzene (TATB),
encapsulating PETN and LM-105 explosives,
protecting explosives from thermal and chemical degradation and reaction including keeping bacteria away from the explosive material,
enhancing the transport into fractures including desirable surface parameters, materials, and buoyancy,
being positioned and stored in fractures until detonation is desired,
use in other applications where it is hard to get explosives into small spaces,
use as acoustic sources for mapping fractures using microseismic methods, and
other applications where encapsulated microenergetic materials can be used.

Encapsulated Microenergetic Materials

Figure 1B:
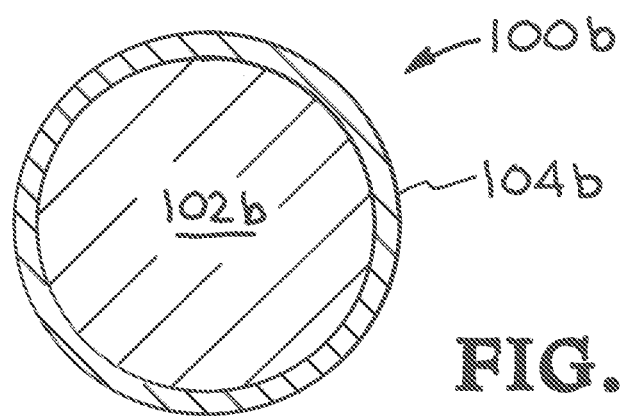
Figure 1C:
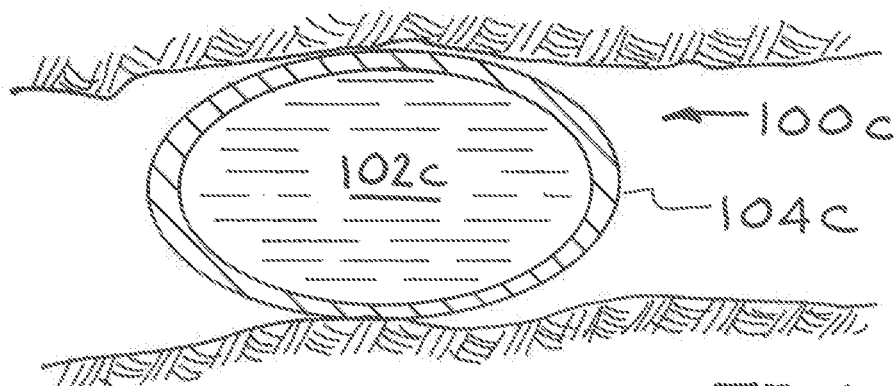

Referring now to the drawings and in particular to FIGS. 1A, 1B, and 1C some specific embodiments of encapsulated microenergetic materials of the present invention are illustrated. FIG. 1A illustrates an embodiment of encapsulated microenergetic material of the present invention. The embodiment is designated generally by the reference numeral 100a. The microcapsule 100a encapsulates an explosive 102a in liquid form inside a polymer coat 104a making a unit of encapsulated microenergetic material. The polymer coat 104a can be made of any of several families of polymers, including polystyrene, polyethylene, polypropylene, nylon, and others. The polymer can be selected and processed so that the surface of the polymer coat 104*a* performs a function in enhancing the transport of the encapsulated microenergetic material into fractures. The polymer can be selected and processed so that the surface of the polymer coat 104*a* includes desirable surface parameters such as stickiness and slipperiness. The polymer can be selected and processed so that the encapsulated microenergetic material has desirable properties such as selected buoyancy.

The explosive 102*a* is an encapsulated energetic material. The energetic material may be of any type. The explosive 102*a* shown in FIG. 1A is in a liquid form, either as a pure liquid or a suspension, the energetic material is encapsulated in a polymer shell which is then solidified by UV, heat, or other polymer catalysts to form a continuous shell. One important aspect of the present invention is that it is possible to use very insensitive explosives such as TATB in these applications. At the surface, under normal pressure and temperature, these explosives are difficult to detonate and therefore safer to handle than other explosives. When injected underground however, they will be at higher temperatures (100 to 200 C) and higher pressures (200 to 1500 bar) and become more sensitive, approaching the sensitivity of conventional explosives like TNT.

Under these conditions the encapsulated explosive can be detonated by a conventional charge, such as one located in the well bore, which creates a shockwave that travels through the water-filled fracture and detonates the encapsulated explosives in the fracture. In one embodiment the explosive 102 is TATB (triamino-trinitrobenzene). TATB's resistance to heat and physical shock is greater than that of any other known material of comparable energy.

Referring now FIG. 1B, another specific embodiment of an encapsulated microenergetic material of the present invention is illustrated. The embodiment is designated generally by the reference numeral 100*b*. The microcapsule 100*b* encapsulates an energetic material 102*b* in solid form inside a polymer coat 104*b* making a unit of encapsulated microenergetic material. The polymer coat 104*b* can be made of any of several families of polymers, including polystyrene, polyethylene, silicones, polypropylene, nylon, and others. The polymer can be selected and processed so that the surface of the polymer coat 104 performs a function in enhancing the transport of the encapsulated microenergetic material into fractures.

The polymer can be selected and processed so that the surface of the polymer coat 104*a* includes desirable surface parameters such as stickiness and slipperiness with regard to the fracture walls, enhancing placement. This can further be targeted by selecting the capsule shell to be wettable by oil, and more likely to remain in the fracture in a location in which oil exists. The polymer can be selected and processed so that the encapsulated microenergetic material has desirable properties such as selected buoyancy. The capsule shell and incorporate material can be adjusted to be very stiff or very flexible as required for placement in the target formation.

The energetic material 102*b* is an encapsulated energetic material. The energetic material may be of any type. The energetic material 102*b* shown in FIG. 1B is in a solid form and the energetic material is encapsulated in a polymer shell which is then solidified by UV, heat, or other polymer catalysts to form a continuous shell. One important aspect of the present invention is that it is possible to use very insensitive explosives such as TATB in these applications.

At the surface, under normal pressure and temperature, these explosives are difficult to detonate and therefore safer to handle than other explosives. When injected underground however, they will be at higher temperatures (100 to 200 C) and higher pressures (200 to 1500 bar) and become more sensitive, approaching the sensitivity of conventional explosives like TNT.

Under these conditions the encapsulated explosive can be detonated by a conventional charge such as those used for perforating casing, which creates a shockwave that travels through the water-filled fracture and detonates the encapsulated explosives in the fracture. In one embodiment the energetic material 102*b* is TATB (triamino-trinitrobenzene). TATB's resistance to heat and physical shock is greater than that of any other known material of comparable energy.

Referring now FIG. 1C, another specific embodiments of an encapsulated microenergetic material of the present invention is illustrated. The embodiment is designated generally by the reference numeral 100*c*. The microcapsule 100*c* encapsulates an energetic material 102*c* inside a polymer coat 104*c* making a unit of encapsulated microenergetic material. The polymer coat 104*c* and the energetic material 102*c* are selected and processed so that the microcapsule 100*c* will deform for placement in small fractures. The polymer can be selected and processed so that the surface of the polymer coat 104*b* includes desirable surface parameters such as stickiness and slipperiness. The polymer can be selected and processed so that the encapsulated microenergetic material has desirable properties such as selected buoyancy.

Encapsulated Microenergetic Material Making System

Figure 2:
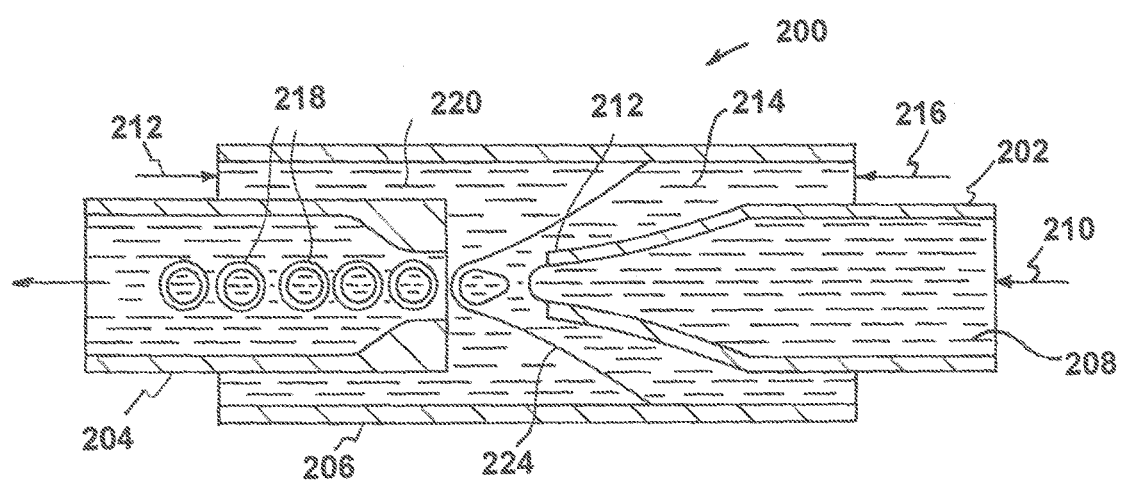
FIG. 2 illustrates a system for making encapsulated energetic material.

Referring now to FIG. 2 a system for making polymer coated microcapsules containing energetic material is illustrated. The system for making encapsulated microenergetic material is designated generally by the reference numeral 200. The schematically illustrated system 200 is composed of the following items. The injection tube 202 with a ID (um) and OD 1000 (um), a collection tube 204 with an ID of 500 (um) and OD 1000 (um) and an outer tube 206 of square cross section with ID of 1000 (um) and ID of 1200 (um).

In operation the inner fluid 208 (MEA/H2O) with a viscosity of 10-50 (cP) and a flow rate of 200-800 (Ulh-1) flows in the injection tube 202 in the direction indicated by arrow 210. As this fluid proceeds it passes thru a droplet forming nozzle 212. The formed droplet is released from the nozzle and becomes encased in the middle fluid 214 (NOA Pre-polymer) with a viscosity of 10-50 (cP) and flow rate of 200-800 (uLh-1), the middle fluid 214 is flowing in the direction indicated by arrow 216. The droplet in the middle fluid 214 becomes encased in the middle fluid 214 forming encapsulated microcapsules 218 that have microenergetic material in a core with a thin outer shell. The outer fluid (PVA Stabilizer) with a viscosity of 10-50 (cP) and a flow rate of 200-800 (uLh-1) flowing in the outer tube 206 in the direction indicated by arrow 222. This outer fluid 220 carries the fabricated microcapsules 218 into the collection tube 204. There is a boundary layer 224 that prevents the middle fluid 214 and outer fluid 220 from mixing as they have a large difference in both their viscosity and flow rates. The above described method will produce encapsulated microenergetic material of a controlled size with an inner fluid liquid ion exchange chemicals enclosed in a shell.

The material inside will usually be a solid high explosive material, or a mixture of high explosive and non-explosive material. This can be formed by the method described in the Bourcier ROI in which a solution of chemical explosive dissolved in a solvent is the original liquid inside the shell.

The explosive or energetic material is precipitated into solid form by extracting solvent through the shell via various means described in Bourcier including chemical gradient and heating/evaporation. The explosive may also be formed by encapsulating a slurry of solid material in solvent, and extracting the solvent as above.

The encapsulation may also be accomplished by coating spheres of energetic material or high explosive by other coating means such as vapor deposition, etc., that are commonly used for coating solid materials. The primary method described here achieves more uniform capsules with correctly engineered high explosive formulations.

Systems for producing microcapsules are described in U.S. Pat. No. 7,776,927 and in U.S. Published Patent Application Nos. 2009/0012187 and 2009/0131543. U.S. Pat. No. 7,776,927 to Liang-Yin Chu et al, assigned to the President and Fellows of Harvard College, discloses emulsions and the production of emulsions, including multiple emulsions and microfluidic systems for producing multiple emulsions. A multiple emulsion generally describes larger droplets that contain one or more smaller droplets therein which, in some cases, can contain even smaller droplets therein, etc. Emulsions, including multiple emulsions, can be formed in certain embodiments with generally precise repeatability, and can be tailored to include any number of inner droplets, in any desired nesting arrangement, within a single outer droplet. In addition, in some aspects of the invention, one or more droplets may be controllably released from a surrounding droplet. U.S. Published Patent Application No. 2009/0012187 to Liang-Yin Chu et al, assigned to the President and Fellows of Harvard College, discloses multiple emulsions, and to methods and apparatuses for making emulsions, and techniques for using the same. A multiple emulsion generally describes larger droplets that contain one or more smaller droplets therein which, in some cases, can contain even smaller droplets therein, etc. Emulsions, including multiple emulsions, can be formed in certain embodiments with generally precise repeatability, and can be tailored to include any number of inner droplets, in any desired nesting arrangement, within a single outer droplet. In addition, in some aspects of the invention, one or more droplets may be controllably released from a surrounding droplet. U.S. Published Patent Application No. 2009/0131543 to David A. Weitz discloses multiple emulsions, and to methods and apparatuses for making multiple emulsions. A multiple emulsion, as used herein, describes larger droplets that contain one or more smaller droplets therein. The larger droplet or droplets may be suspended in a third fluid in some cases. In certain embodiments, emulsion degrees of nesting within the multiple emulsion are possible. For example, an emulsion may contain droplets containing smaller droplets therein, where at least some of the smaller droplets contain even smaller droplets therein, etc. Multiple emulsions can be useful for encapsulating species such as pharmaceutical agents, cells, chemicals, or the like. In some cases, one or more of the droplets (e.g., an inner droplet and/or an outer droplet) can change form, for instance, to become solidified to form a microcapsule, a lipo some, a polymero some, or a colloid some. As described below, multiple emulsions can be formed in one step in certain embodiments, with generally precise repeatability, and can be tailored to include one, two, three, or more inner droplets within a single outer droplet (which droplets may all be nested in some cases). As used herein, the term "fluid" generally means a material in a liquid or gaseous state. Fluids, however, may also contain solids, such as suspended or colloidal particles. U.S. Pat. No. 7,776,927 and U.S. Published Patent Application Nos. 2009/0012187 and 2009/0131543 are incorporated herein by this reference.

The present invention provides benefits in fabrication and manufacturability. The encapsulated microenergetic material can be fabricated at a size small enough for efficient mass transfer and large enough for ease of handling. The present invention provides methods to fabricate liquid filled shells in the size range of 100 microns to 5 mm with wall thickness from 5-100 microns. The present invention provides benefits in survivability and robustness. The present invention identifies several polymers that can withstand typical regeneration temperatures of 100-250° C. In addition, the selected polymers will be capable of withstanding small volumetric changes. The polymers can be made of various polymers including polymers made of Poly(l-trimethylsilyl propyne), Vinyl alcohol/acrylate copolymer, Polydimethylsiloxane (PDMS), Teflon AF, Polyimide with 6FDA groups, Cellulose acetate, and Poly(vinyl alcohol).

Creating, Expanding, and Enhancing Fractures

Figure 3:
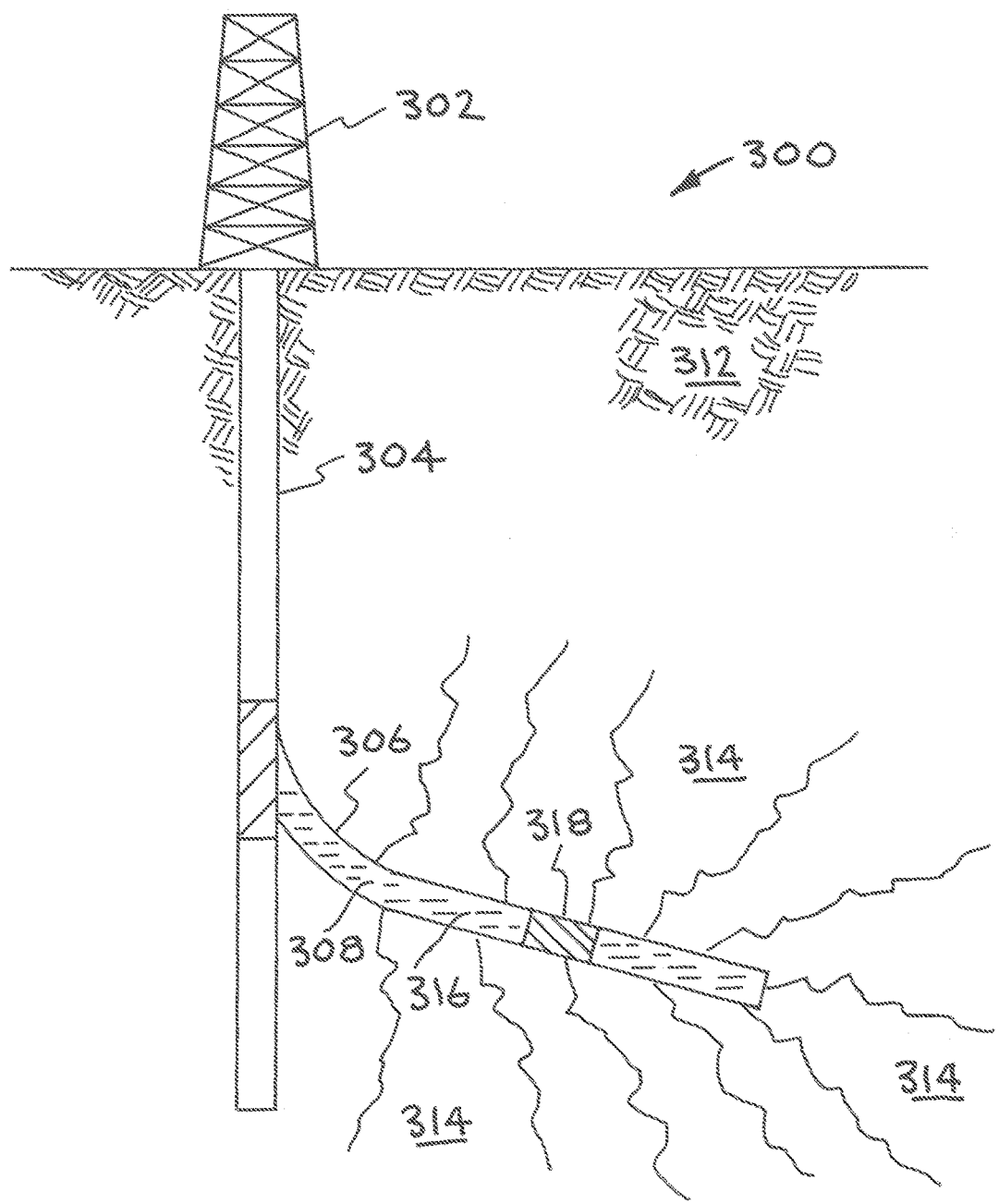
FIG. 3 illustrates an example of the present invention.

Referring now to FIG. 3, an example of a system of the present invention is illustrated. This example is designated generally by the reference numeral 300. The system 300 provides a method wherein high energy materials can be placed in previously created fractures and activated in place in order to extend or change the shape of an existing fracture system. The system 300 also provides a method of nucleating new fracture points. The system 300 also provides a means of locating fractures and the extent and adequacy of emplaced proppant by using the energetic microcapsules as acoustic sources. A well 304 is shown extending into the earth 312 and into or proximate a formation 314 penetrated by the well 304 or proximate the well 304. A derrick 302 is shown above the well 304 for performing operations on the well 304.

A slanted or side borehole 306 extends into or proximate the formation 314. Encapsulated microenergetic materials 308 are placed in the slanted or side borehole 306 away from the main borehole 304. The slanted or side borehole 306 is isolated from the main borehole 304. A fluid 316 extends into the geological formation 314. The fluid 314 is isolated from the main borehole 305. A charge 318 is detonated energetically stimulating the fluid 316 in the geological formation 314 initiating the encapsulated microenergetic materials 308. Initiation of the encapsulated microenergetic materials 308 extends the fractures and initiates new fractures with rock stress created by detonating or deflagrating the encapsulated microenergetic materials 308. The strategic location of that and placement of the encapsulated energetic material within the rock mass without chemical degradation during emplacement is possible because the explosive is protected by the polymer shell.

Figure 4A:
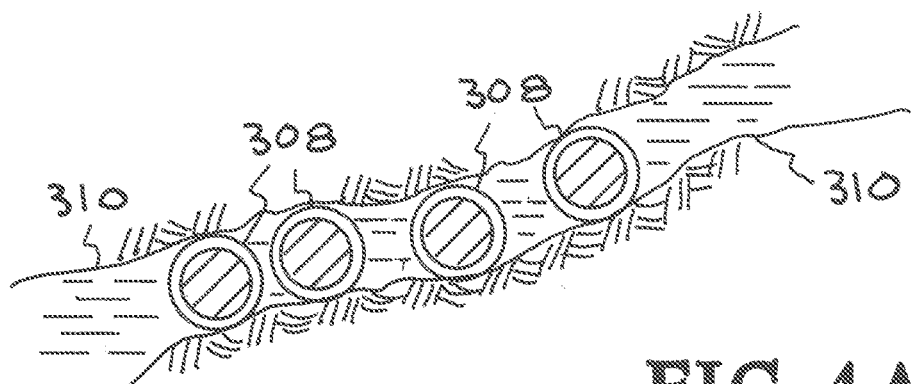
FIGS. 4A and 4B show the encapsulated microenergetic materials placed in a fracture.
Figure 4B:
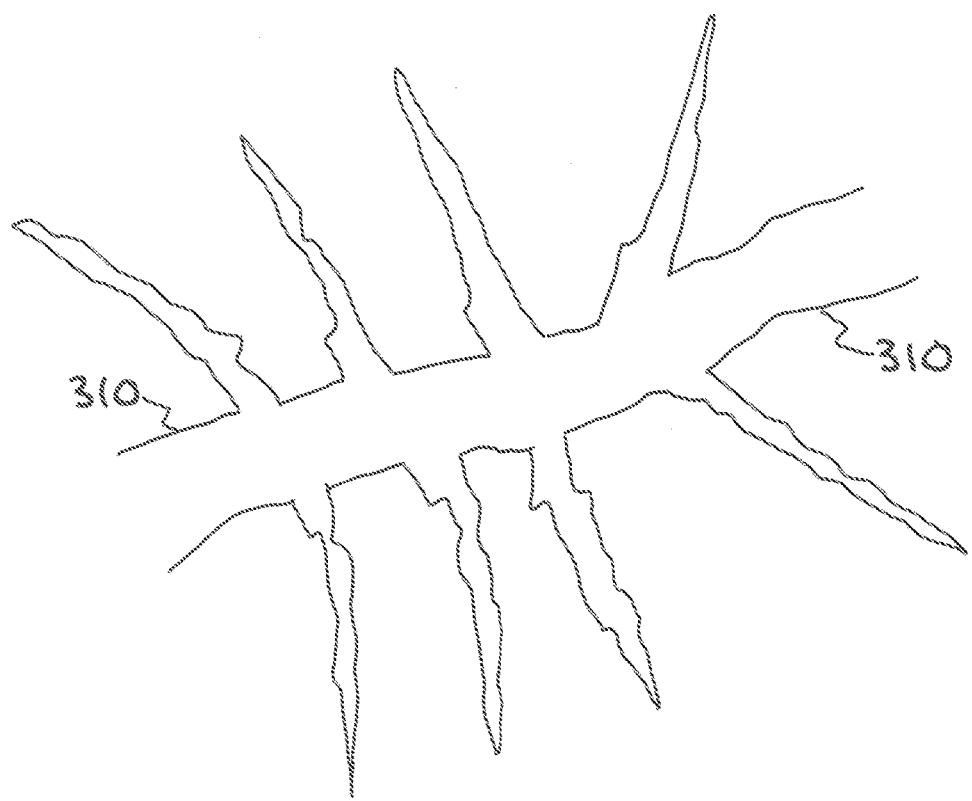

Referring now to FIG. 4A, the encapsulated microenergetic materials 308 are shown placed in the fracture 310. Once in place the encapsulated microenergetic materials 308 are triggered. Since this directs energy into the formation and existing fractures a more desirable fracture pattern is developed. This resulting fracture pattern will access a larger volume of the formation in the region of interest enabling better and more efficient extraction of gas, oil, or heat. This also provides protection of the borehole and direction of the energy into the specific region(s) of interest. As illustrated in FIG. 4B, the encapsulated microenergetic materials 308 nucleate new fracture points. New fractures are produce by the encapsulated microenergetic materials 308 and may be enhanced by hydrofracking.

Mapping Fractures

The present invention provides the detection and mapping of the location of a fracture(s). It is currently difficult to detect the location, shape, and extent of an underground fracture, such as those created during natural gas extraction by hydrofracturing. It is of considerable interest to know exact shape and orientation of the fractures for design purposes, and to ensure that the rock volume is adequately accessed by the created fractures. Today there is no direct means to do this other than to excavate the fracture, which cannot be done except in extraordinary circumstances. Geophysical methods are used to attempt to image the contrasting properties between the fluid-filled fracture and the rock, but these methods are typically low resolution (meters) by comparison to the aspect of the fracture (millimeters) making it nearly impossible to image the fracture.

By contrast the present invention make it possible to detect the fractures by using the encapsulated microenergetic material as acoustic sources within the fracture, which allows precise maps of the fracture (actually maps of the locations of the acoustic sources which are within the fracture) to be made by seismic and acoustic methods. Today that is not possible because there is no source of seismic/acoustic energy that can be placed within the fracture.

Figure 5:
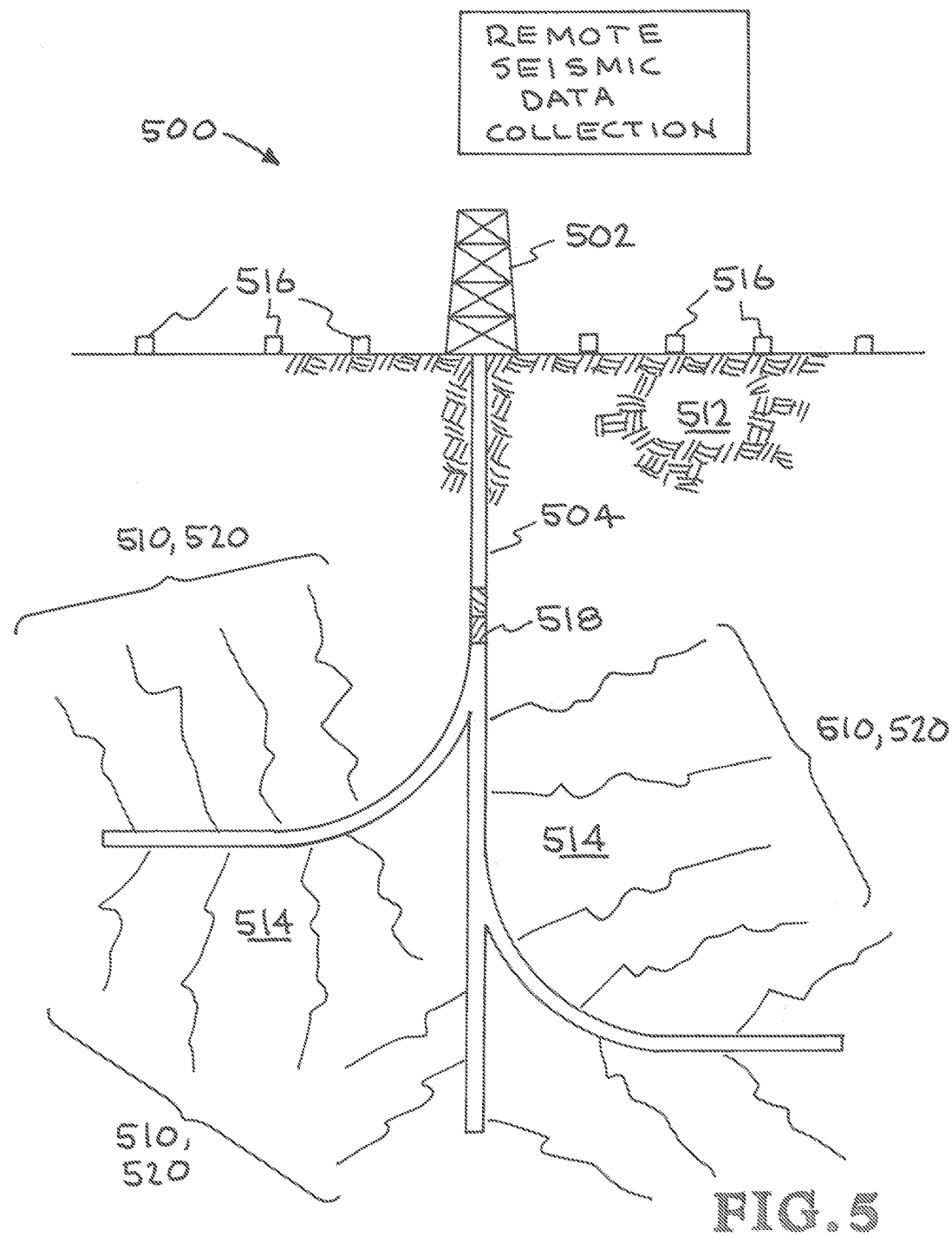
FIG. 5 is an example of a mapping system of the present invention.

Referring now to FIG. 5, an example of a mapping system of the present invention is illustrated. This mapping system is designated generally by the reference numeral 500. The system 500 provides a method wherein high energy materials are placed in fractures 510 and activated in place in order to acoustic sources within the fracture 510, which allows precise maps of the fracture (actually maps of the locations of the acoustic sources which are within the fracture) to be made by seismic and acoustic methods. A well 504 is shown extending into the earth 512 and into or proximate a formation 514 penetrated by the well 504 or proximate the well 504. A derrick 502 is shown above the well 504 for performing operations on the well 504. Sets of encapsulated microenergetic materials 520 are placed in fractures in the formation 514. A detonator 518 is positioned to ignite the sets of encapsulated microenergetic materials 520. Remote seismic units 516 are positioned to receive and collect data when the encapsulated microenergetic materials 520 are detonated.

During detonation the energetic material acts as an acoustic source and can be used in the detection and mapping of the fracture network. It is currently difficult to detect the location, shape, and extent of an underground fracture system, such as those created during natural gas extraction by hydrofracturing. Using this invention and an array of downhole and surface acoustic sensors will permit more precise location and characterization of the fracture networks. With this information the networks can be more accurately evaluated and subsequent fracturing stages designed.

Figure 6:
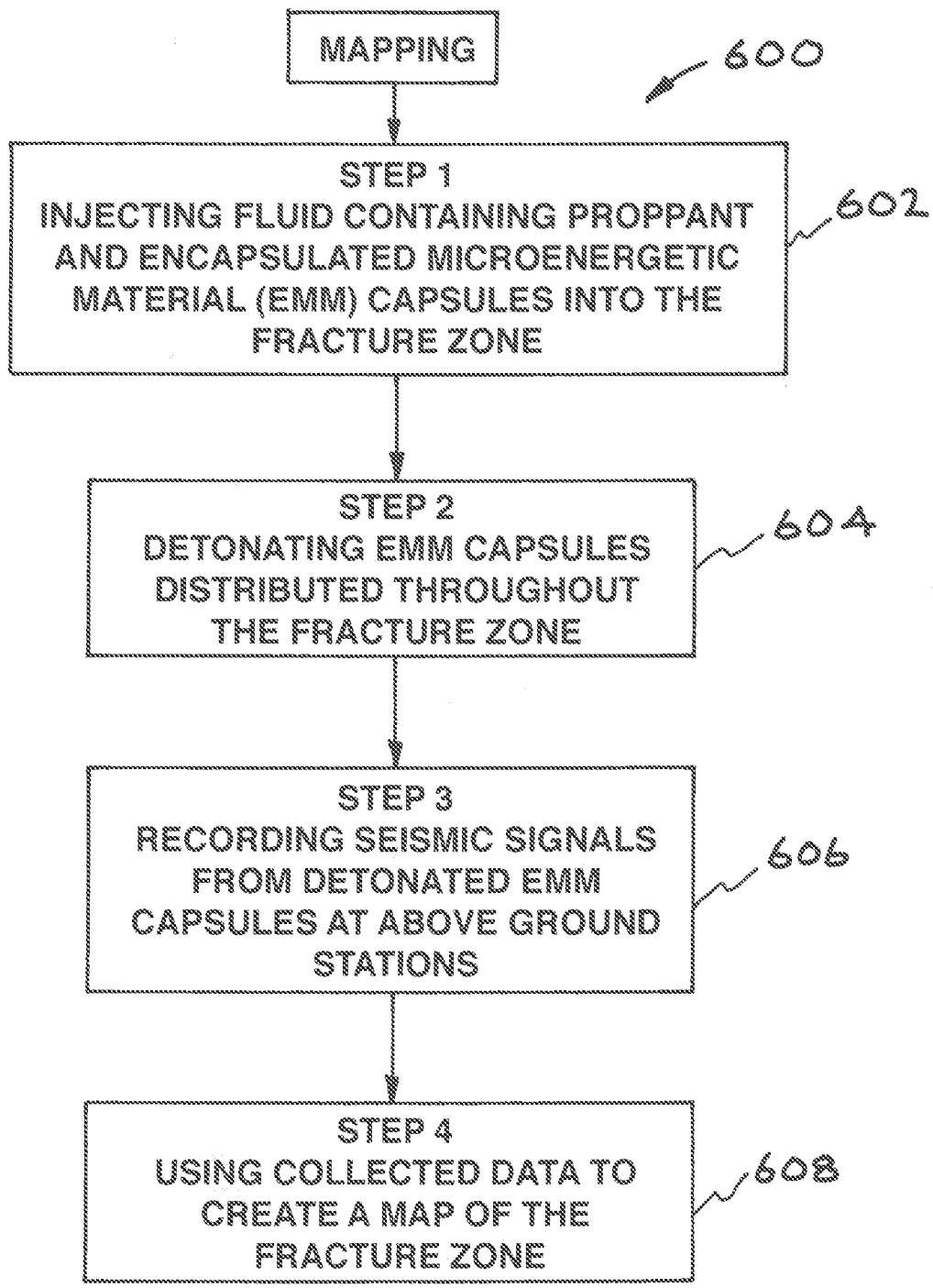
FIG. 6 is a flow chart illustrates one embodiment of a mapping system of the present invention.

Referring now to FIG. 6, a flow chart illustrates one embodiment of a mapping system of the present invention. This mapping system is designated generally by the reference numeral 600. The system 600 provides a method wherein high energy materials are placed in fractures and activated in place in order to acoustic sources within the fracture, which allows precise maps of the fracture (actually maps of the locations of the acoustic sources which are within the fracture) to be made by seismic and acoustic methods.

In step 1 designated by the reference numeral 602, a fluid containing proppants and encapsulate microenergetic material is injected into the formation. In step 2 designated by the reference numeral 604, the encapsulate microenergetic material is detonated producing shockwaves in the formation. In step 3 designated by the reference numeral 606 the shockwaves in the formation are recorded by stations above ground. In step 4 designated by the reference numeral 608 the recorded data is used to create a map of the fracture zone and individual fractures.

During detonation the energetic material acts as a seismic source and can be used in the detection and mapping of the fracture network. It is currently difficult to detect the location, shape, and extent of an underground fracture system, such as those created during natural gas extraction by hydrofracturing. Using this invention and an array of downhole and surface acoustic sensors will permit more precise location and characterization of the fracture networks. With this information the networks can be more accurately evaluated and subsequent fracturing stages designed.

Secondary Fracturing

Figure 7:
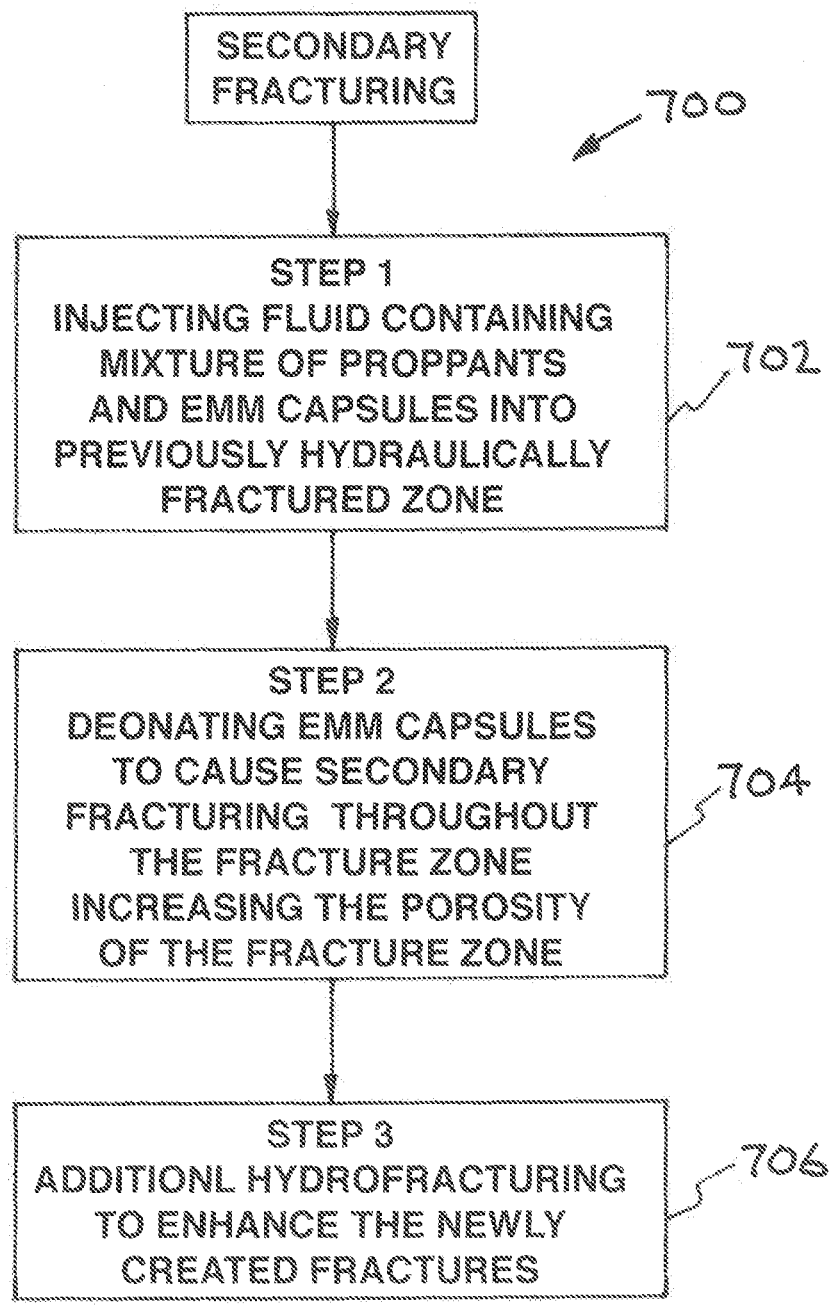
FIG. 7 is a flow chart illustrating secondary fracturing using the present invention.

Referring now to FIG. 7, a flow chart illustrates one embodiment of secondary fracturing using the present invention. This secondary fracturing system is designated generally by the reference numeral 700. The secondary fracturing system 700 provides a method wherein encapsulate microenergetic materials are placed in existing fractures and activated in order to extend the fractures and initiate new fractures. In step 1 designated by the reference numeral 702, a fluid containing proppants and encapsulate microenergetic material is injected into the formation. In step 2 designated by the reference numeral 704, the encapsulate microenergetic material is detonated directing energy into the formation and existing fractures producing a more desirable fracture pattern. Detonating the encapsulated microenergetic materials nucleates new fracture points. New fractures are produce by the detonation of the encapsulated microenergetic materials. In step 3 designated by the reference numeral 706, the fractures are enhanced by hydrofracking.

This method is particularly useful for creating fractures that branch from the main fracture. This is because hydrofracturing tends to occur on a single main fracture once the injection pressure reaches the hydrofracture pressure under the existing conditions. That fracture then extends at the hydrofracture pressure as additional fluid is pumped into the fracture, or if a plurality of fractures is initially formed, one tends to dominate and become much longer. It is often advantageous to have branching fractures which cannot normally be obtained in this fashion because the pressure cannot be raised significantly above the hydrofracture point (the fracture becomes longer and the pressure is reduced). This invention circumvents that limitation because the energetic material is emplaced at the hydrofracture pressure, and when detonated it locally raises the pressure much above that point, enabling the initiation and creation of local branching fractures.

Encapsulated Microenergetic Materials and Proppants

Figure 8A:
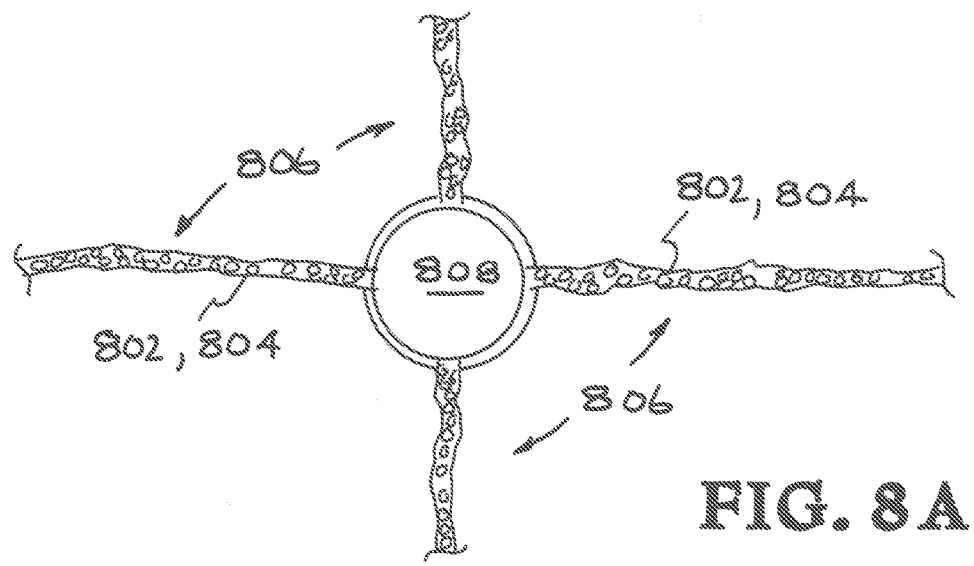
FIGS. 8A and 8B show encapsulated microenergetic materials and proppants.
Figure 8B:
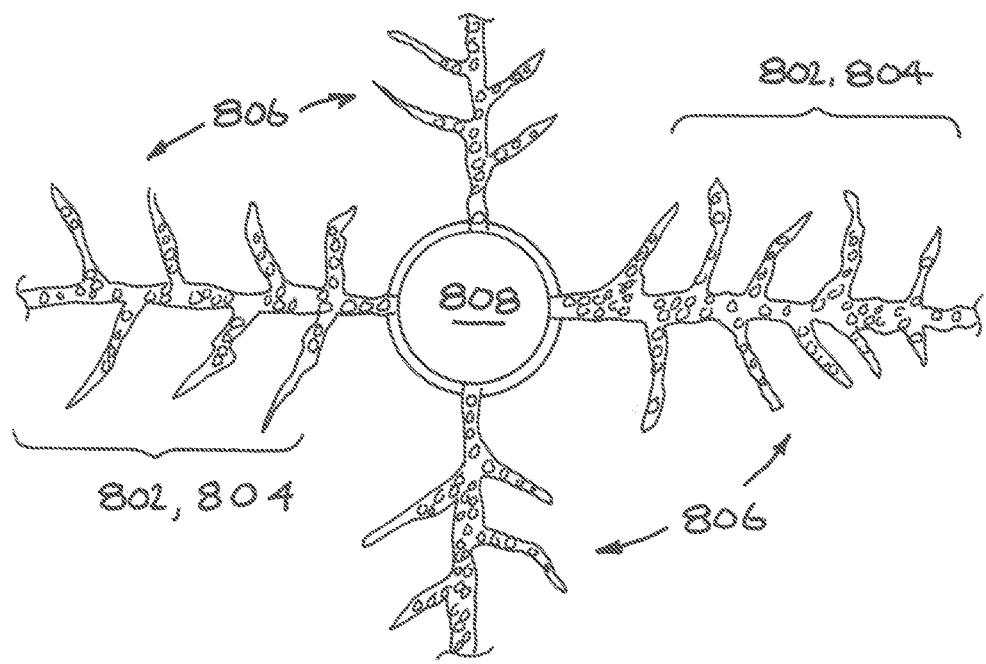

Referring now to FIGS. 8A and 8B, the encapsulated microenergetic materials 802 and proppants 804 are shown placed in the fractures 806. In FIG. 8A the encapsulated microenergetic materials 802 and proppants 804 are transported down the borehole 808 and into the fractures 806. FIG. 8B is an enlarged view of the borehole 808 with the encapsulated microenergetic materials 802 and proppants 804 located in the fractures 806.

Future Well Recovery

Figure 9:
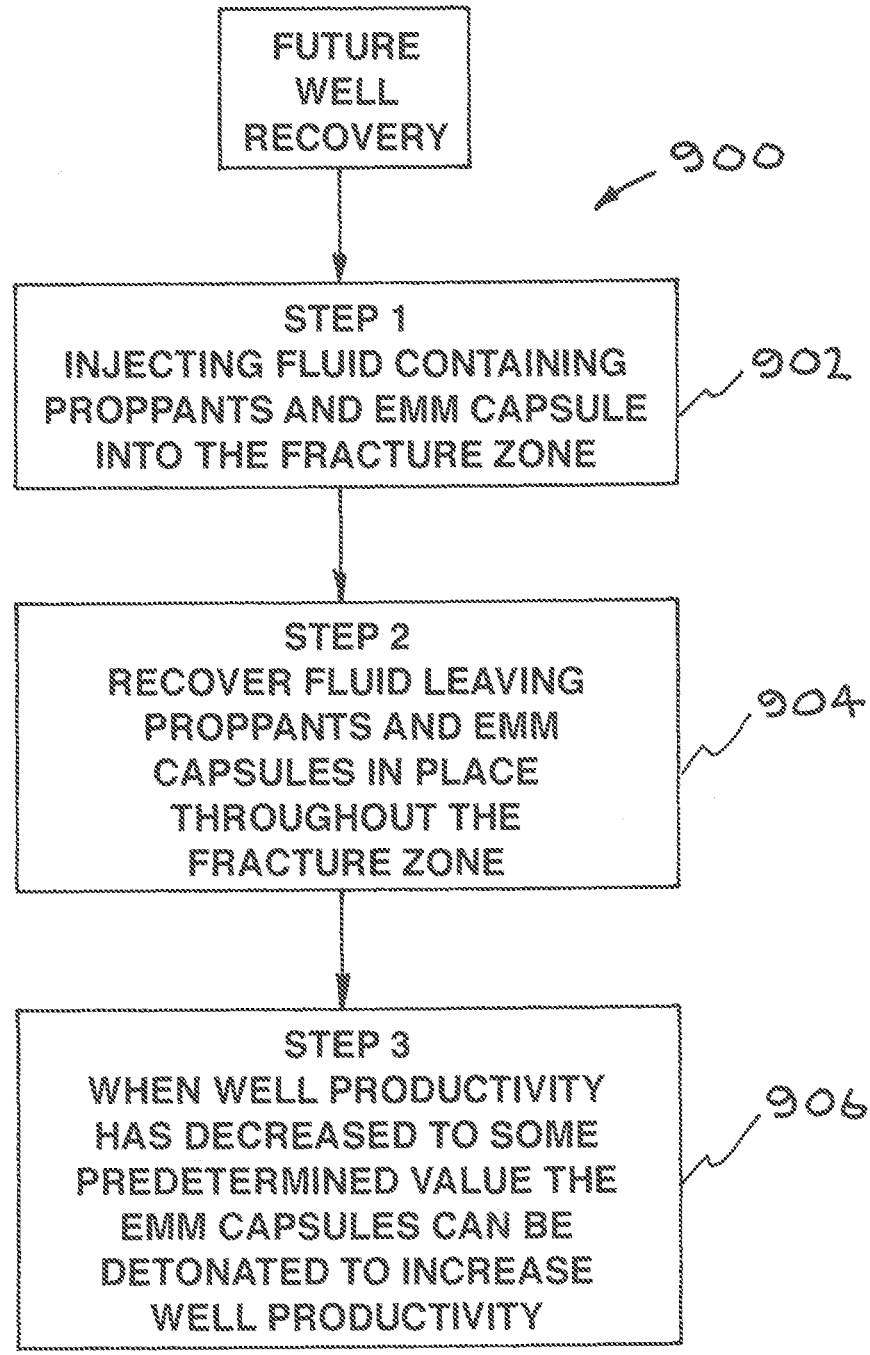
FIG. 9 is a flow chart illustrating encapsulated microenergetic materials placed for future well fracturing.

Referring now to FIG. 9, a flow chart illustrates a system of the present invention wherein the encapsulated microenergetic materials are positioned in the fractures during existing well operations and left in place until it becomes desirable to do further expansion of the fractures. In step 1 designated by the reference numeral 902, a fluid containing proppants and encapsulated microenergetic material is injected into the formation. In step 2 designated by the reference numeral 904, the encapsulated microenergetic materials are left in place until it becomes desirable to do further expansion of the fractures. The encapsulated microenergetic material is protected from degradation and reaction during the time it is left in place. The polymer shell provides protection of the encapsulated microenergetic material. The polymer shell protects the encapsulated microenergetic material from chemical and thermal degradation, by degradation by bacteria and other degrading material in the formation. In step 3 designated by the reference numeral 906, the encapsulate microenergetic material is detonated directing energy into the formation and existing fractures producing an improved fracture pattern.

Forming Different Types of Fractures

Figure 10A:
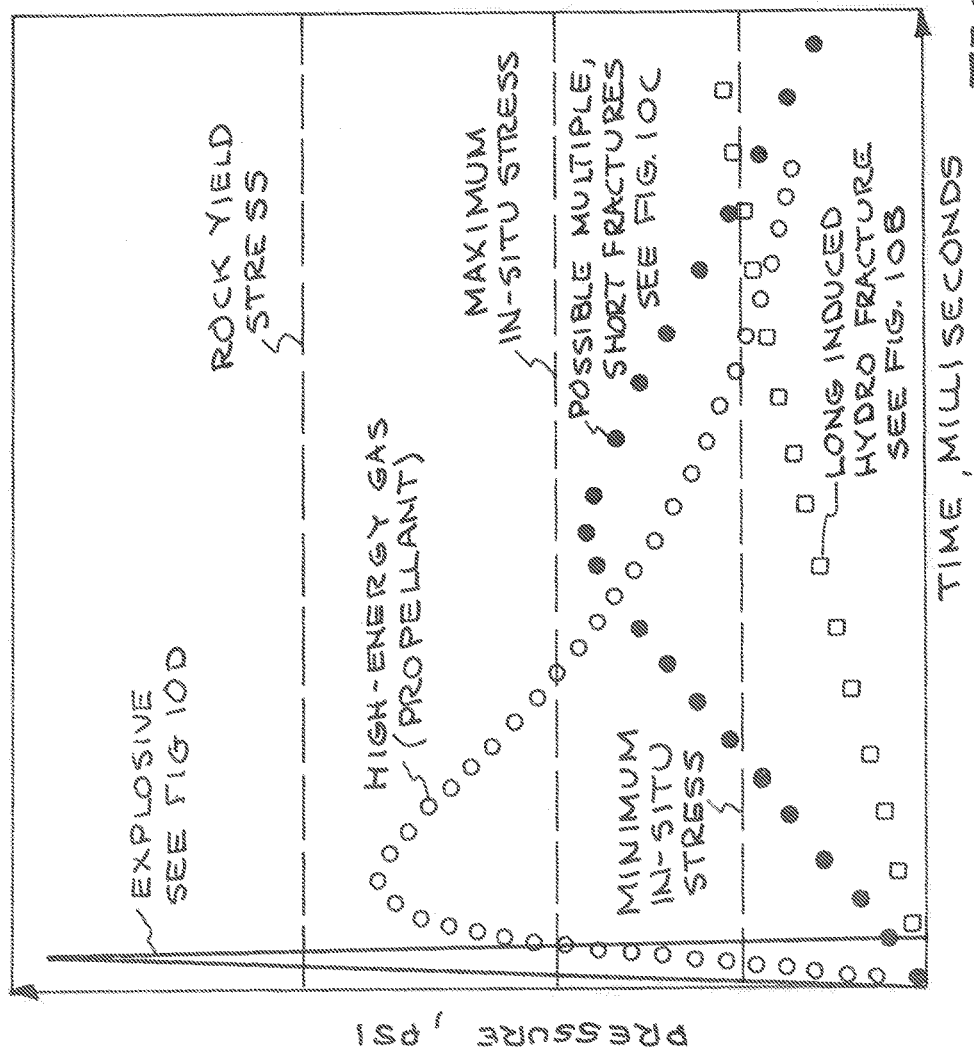
FIGS. 10A through 10E illustrate methods of formation of different types of fractures.

FIGS. 10A through 10E provide illustrations and descriptions of methods of the formation of different types of fractures. FIG. 10A is a graph depicting several fracturing methods for increasing the porosity in the field of interest.

Figure 10B:
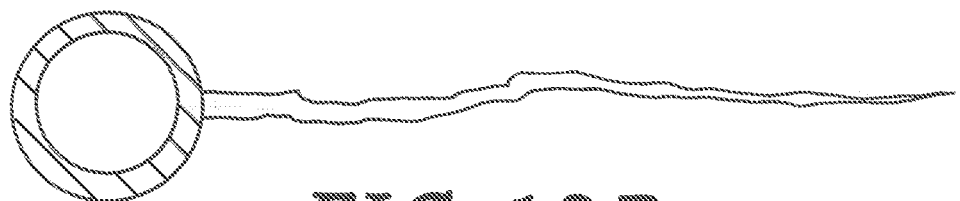

The open squares curve labeled "long, induced hydro-fracture" in FIG. 10A represents the most used method of fracturing the formation. The "long, induced hydro-fracture" fracture is illustrated in FIG. 10B. The fracture illustrated in FIG. 10B, will create long fractures but not the maximum desired porosity. The open circle curve labeled "high-energy gas propellant" in FIG. 10A also creates long fractures.

Figure 10C:
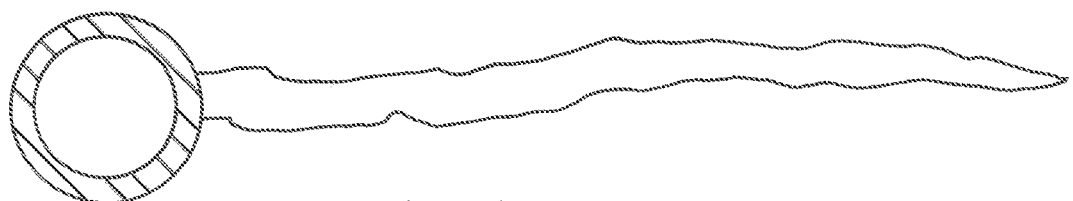

The solid circle curve labeled "maximum in-situ stress" in FIG. 10A represents a fracturing system where possible multiple short fractures are produced. The "maximum in-situ stress" fracture is illustrated in FIG. 10C. The fracture illustrated in FIG. 10C, will possibly produce multiple short fractures.

Figure 10D:
Figure 10E:
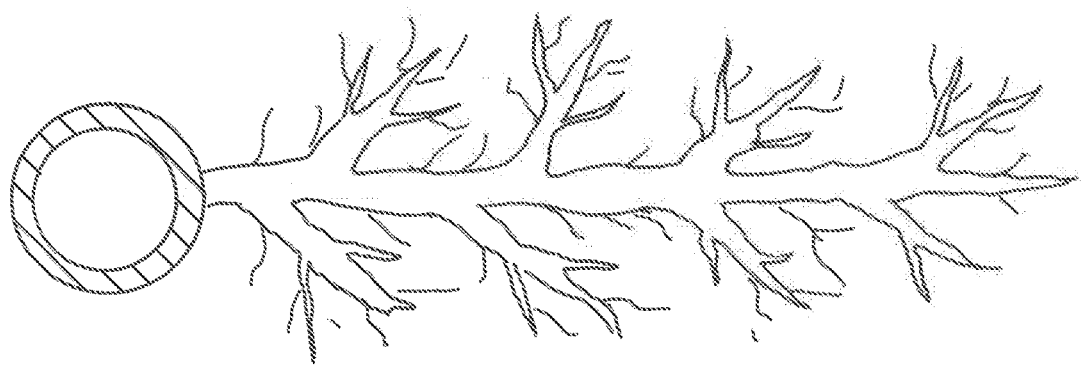

The solid line curve labeled "explosive" in FIG. 10A represents the production of a type of fracture that is not a desirable method. The "explosive" fracture is illustrated in FIG. 10D. The fracture illustrated in FIG. 10D is not a desired method of fracturing because it just crumbles the rock in the formation and the pressure of the overburden will quickly seal the cracks created by the explosives.

Referring now to FIG. 10 E, a more desirable fracture pattern is illustrated. This fracture pattern will access a larger volume of the formation in the region of interest enabling better and more efficient extraction of gas, oil, or heat. The fracture illustrated in FIG. 10E will greatly increase the desired porosity in the formation. The fracture illustrated in FIG. 10E is produced by the methods and apparatus of the present invention.

Although the description above contains many details and specifics, these should not be construed as limiting the scope of the invention but as merely providing illustrations of some of the presently preferred embodiments of this invention. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present invention fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method of fracturing a geological formation having existing fractures, comprising the steps of:
   providing a spherical core of energetic materials that is a solid sphere,
   providing a spherical outer shell that is made of a polymer,
   encapsulating said spherical core of energetic materials with said spherical outer shell completely surrounding and encasing said spherical core of energetic materials to produce encapsulated microenergetic materials,
   solidifying said spherical outer shell that is made of a polymer using ultraviolet light or heat,
   positioning said encapsulated microenergetic materials in the existing fractures of the geological formation, and
   detonating said encapsulated microenergetic materials for fracturing the geological formation having the existing fractures.

2. The method of fracturing a geological formation having existing fractures of claim 1 wherein said step of encapsulating a spherical core of energetic materials with a spherical outer shell completely surrounding and encasing said spherical core of energetic materials to produce encapsulated microenergetic materials comprises flowing said microenergetic materials through a droplet forming nozzle to form a droplet surrounded by a fluid of encapsulating polymer producing a sphere having a shell of said encapsulating polymer completely surrounding a sphere of said microenergetic materials thereby encapsulating microenergetic materials in a polymer shell.

3. The method of fracturing a geological formation having existing fractures of claim 1 wherein said step of encapsulating a spherical core of energetic materials with a spherical outer shell completely surrounding and encasing said spherical core of energetic materials to produce encapsulated microenergetic materials comprises flowing said microenergetic materials through a droplet forming nozzle to form a droplet surrounded by a fluid of encapsulating polymer producing a sphere of a size that will fit in the existing fractures having a shell of said encapsulating polymer completely surrounding a sphere of said microenergetic materials thereby encapsulating microenergetic materials in a polymer shell having a size that fits within the existing fractures.

4. The method of fracturing a geological formation having existing fractures of claim 1 wherein said step of encapsulating energetic materials a spherical core of energetic materials with a spherical outer shell completely surrounding and encasing said spherical core of energetic materials to produce encapsulated microenergetic materials comprises flowing said microenergetic materials through a droplet forming nozzle to form a droplet surrounded by a fluid of polystyrene, polyethylene, polypropylene, or nylon encapsulating polymer producing a sphere having a shell of said encapsulating polymer completely surrounding a sphere of said microenergetic materials thereby encapsulating microenergetic materials in a polymer shell wherein said polymer shell is made of polystyrene, polyethylene, polypropylene, or nylon.

5. The method of fracturing a geological formation having existing fractures of claim 1 wherein the step of providing a spherical outer shell that is made of a polymer comprises selecting a material for said spherical outer shell that is a polymer that will provide said spherical outer polymer shell with a surface that is slippery.

6. The method of fracturing a geological formation having existing fractures of claim 1 wherein the step of providing a spherical outer shell that is made of a polymer comprises selecting a material for said spherical outer shell that is a polymer that will provide a spherical outer polymer shell with a surface that is sticky.

7. The method of fracturing a geological formation having existing fractures of claim 1 wherein said step of encapsulating a spherical core of energetic materials with a spherical outer shell completely surrounding and encasing said spherical core of energetic materials to produce encapsulated microenergetic materials comprises encapsulating a spherical core of triamino-trinitrobenzene (TATB) with a spherical outer shell completely surrounding and encasing said spherical core of energetic materials to produce encapsulated microenergetic materials.

8. The method of fracturing a geological formation having existing fractures of claim 1 further comprising the step of hydrofracking the geological formation having existing fractures.

9. The method of fracturing a geological formation having existing fractures of claim 1 wherein said step of positioning said encapsulated microenergetic materials in the existing fractures of the geological formation includes leaving said encapsulated microenergetic materials in the existing fractures of the geological formation until a need arises for fracturing the geological formation having existing fractures and then performing said step of geological formation having existing fractures.

* * * * *